United States Patent
Dragone et al.

(10) Patent No.: US 11,228,457 B2
(45) Date of Patent: Jan. 18, 2022

(54) PRIORITY-ARBITRATED ACCESS TO A SET OF ONE OR MORE COMPUTATIONAL ENGINES

(71) Applicant: INTERNATIONAL BUSINESS MACHINES CORPORATION, Armonk, NY (US)

(72) Inventors: Silvio Dragone, Olten (CH); Tamas Visegrady, Zurich (CH); Michael Charles Osborne, Richterswil (CH); William Santiago-Fernandez, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 16/842,268

(22) Filed: Apr. 7, 2020

(65) Prior Publication Data
US 2021/0314185 A1    Oct. 7, 2021

(51) Int. Cl.
*H04L 12/40* (2006.01)
*H04L 12/18* (2006.01)

(52) U.S. Cl.
CPC .... *H04L 12/40084* (2013.01); *H04L 12/1863* (2013.01); *H04L 12/40123* (2013.01)

(58) Field of Classification Search
CPC ........... H04L 12/40084; H04L 12/1863; H04L 12/40123
See application file for complete search history.

(56) References Cited

U.S. PATENT DOCUMENTS

| | | | | |
|---|---|---|---|---|
| 7,007,121 B1* | 2/2006 | Ansari | ................... | G06F 13/364 710/113 |
| 2003/0065842 A1* | 4/2003 | Riley | .................... | G06F 13/423 710/105 |
| 2007/0139423 A1* | 6/2007 | Kong | ..................... | G09G 5/363 345/502 |

(Continued)

FOREIGN PATENT DOCUMENTS

WO    20190941181 W    5/2019

OTHER PUBLICATIONS

Jo et al., "FLSCHED: A Lockless and Lightweight Approach to OS Scheduler for Xeon Phi", APSys '17, Sep. 2, 2017, Mumbai, India, 8 pages.

*Primary Examiner* — Stephen J Clawson
(74) *Attorney, Agent, or Firm* — Tihon Poltavets (57) ABSTRACT

The present invention discloses a method for managing priority-arbitrated access to a set of one or more computational engines of a physical computing device. The method includes providing a multiplexer module and a network bus in the physical computing device, wherein the multiplexer module is connected to the network bus. The method further includes receiving, by the multiplexer module, a first data processing request from a driver and inferring, by the multiplexer module, a first priority class from the first data processing request according to at least one property of the first data processing request. The method further includes manipulating, by the multiplexer module, a priority according to which the physical computing device handles data associated with the first data processing request in relation to data associated with other data processing requests, wherein the priority is determined by the first priority class.

19 Claims, 7 Drawing Sheets

(56) References Cited

U.S. PATENT DOCUMENTS

2015/0007177 A1\* 1/2015 Tobo .................. G06F 11/3419
                                                            718/1
2015/0220372 A1   8/2015 Ban
2017/0177365 A1   6/2017 Doshi \* cited by examiner

PRIORITY-ARBITRATED ACCESS TO A SET OF ONE OR MORE COMPUTATIONAL ENGINES

BACKGROUND

A physical computing device may serve multiple users at the same time. Such a system is often called a multitenancy computing system. Serving many different tenants, it may provide extensive computational resources. A multitenancy computing system may feature multiple computational engines which perform computations for its tenants. The computational engines may be cryptographic engines, for instance. Drivers can send requests from the tenants over a network bus of the physical computing system to the computational engines. The computational engines then process the requests and send the results back to the tenants.

Broadly speaking, a multiplexer is a device which can select between different input signals. An input signal can comprise various types of data, for instance a request for performing computations. A multiplexer may distribute multiple requests for performing computations from tenants to multiple computational engines. This allows multiple tenants to make use of a relatively small number of computational engines.

SUMMARY

Various embodiments of the disclosure provide a method for managing priority-arbitrated access to a set of one or more computational engines of a physical computing device. Further embodiments provide a physical computing device suitable for implementing the method for managing priority-arbitrated access to a set of one or more computational engines of a physical computing device. Further embodiments provide a computer program product for operating the physical computing device so that the physical computing device can implement the method for managing priority-arbitrated access to a set of one or more computational engines of a physical computing device. Advantageous embodiments are described in the dependent claims. Embodiments of the present invention can be freely combined with each other if they are not mutually exclusive.

In one aspect, the disclosure relates to a method for managing priority-arbitrated access to a set of one or more computational engines of a physical computing device. The method includes providing a multiplexer module and a network bus in the physical computing device, wherein the multiplexer module is connected to the network bus. The method includes receiving by the multiplexer module a first data processing request from a driver and inferring by the multiplexer module a first priority class from the first data processing request according to at least one property of the first data processing request. The method further includes transmitting, by the multiplexer module communication data to the driver, the communication data being provided for enabling transmission of a first request data unit and a first result data unit between the driver and the multiplexer module, wherein the first request data unit and the first result data unit are associated with the first data processing request. The method further includes receiving, via the network bus by the multiplexer module, the first request data unit from the driver, and in response thereto, processing the first request data unit by the multiplexer module, wherein the processing of the first request data unit comprises transmitting the first request data unit to the set of one or more computational engines. The method further includes manipulating, by the multiplexer module, a priority according to which the physical computing device handles data associated with the first data processing request in relation to data associated with other data processing requests, wherein priority is determined by the first priority class, and in response to transmitting the first request data unit to the set of one or more computational engines, receiving by the multiplexer module the first result data unit from the set of one or more computational engines, and causing, by the multiplexer module, the driver to read the first result data unit from the multiplexer module.

In another aspect, the invention relates to a physical computing device with a multiplexer module and a network bus, the multiplexer module being connected to the network bus, the physical computing device being configured to implement the method which is described above. Further embodiments provide a computer program product for operating a physical computing device with a multiplexer module and a network bus, the multiplexer module being connected to the network bus, the computer program product comprising a computer readable storage medium having program instructions embodied therewith, the program instructions executable by a processor to cause the physical computing device to implement the method which is described above.

BRIEF DESCRIPTION OF THE SEVERAL VIEWS OF THE DRAWINGS

In the following, embodiments are explained in greater detail, by way of example only, making reference to the drawings in which.

DETAILED DESCRIPTION

The descriptions of the various embodiments of the present invention are being presented for purposes of illustration, and are not intended to be exhaustive or limited to the embodiments disclosed. Many modifications and variations will be apparent to those of ordinary skill in the art, without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention relates to a method for managing priority-arbitrated access to a set of one or more computational engines of a physical computing device. According to the invention, a multiplexer module and a network bus are provided in the physical computing device, the multiplexer module being connected to the network bus. The multiplexer module receives a first data processing request from a driver. According to embodiments, the driver may be a unit of the physical computing device which is configured for communicating with the multiplexer over the network bus. Multiple drivers may be present within the physical computing device. According to embodiments, the driver may comprise driver software and/or a network bus transceiver. According to embodiments, a tenant using the physical computing device may employ the driver for communicating with the multiplexer module. According to an embodiment, the engines from the set of computational engines are cryptographic engines, i.e., computational engines specialized for performing cryptographic computations.

The multiplexer module infers a first priority class from the first data processing request according to at least one property of the first data processing request and transmits communication data to the driver, the communication data being provided for enabling transmission of a first request data unit and a first result data unit between the driver and the multiplexer module. The communication data may comprise data transmission indicators for enabling communication between the driver and the multiplexer module. The first request data unit and the first result data unit are associated with the first data processing request. The first request data unit and the first result data unit are used to transmit data associated with the first data processing request. According to embodiments, the first request data unit and the first result data unit may be network data packets. According to embodiments, hardware-relevant attributes such as a maximum size of the first request data unit or a maximum size of the first result data unit may be included in the first data processing request. According to embodiments, the first data processing request may also include further attributes, for instance a request type.

The multiplexer module receives the first request data unit from the driver over the network bus. While the first data processing request was merely a request indicating an intention of the driver to have data processed by the set of one more computational engines, the first request data unit contains an actual computational request associated with the first data processing request. In response to receiving the first request data unit, the multiplexer module processes the first request data unit. This comprises transmitting the first request data unit to the set of one or more computational engines. The first request data unit is transmitted to the set of computational engines so that one of the computational engines may perform a computation specified in the first request data unit. The multiplexer module manipulates a priority according to which the physical computing device handles data associated with the first data processing request in relation to data associated with other data processing requests, said priority being determined by the first priority class. The manipulation via the multiplexer module may apply to handling the first data processing request itself, the first request data unit, the first result data unit, and/or any other data associated with the first data processing request.

In response to transmitting the first request data unit to the set of one or more computational engines, the multiplexer module receives the first result data unit from the set of one or more computational engines and causes the driver to read the first result data unit from the multiplexer module. In this manner, the driver obtains the result data unit. This invention may have the advantage that it allows for priority-arbitration of data processing requests in a physical computing device, which may be particularly advantageous in multitenancy computing systems. In such systems, a large number of tenants may compete for a relatively small amount of computational resources. With a large number of tenants present, it is advantageous when communication takes over a network bus—the network bus provides conflict resolution by means of bus arbitration.

According to an embodiment of the invention, the set of one or more computational engines may form a part of the physical computing device. According to embodiments, the first request data unit contains at least one instruction for performing a computation. According to other embodiments, the first result data unit contains at least one result of a computation performed by a computational engine from the set of one or more computational engines. According to an embodiment, a computational engine from the set of one or more computational engines performs a computation according to an instruction from the first request data unit in response to receiving the first request data unit. The computational engine may then transmit a result of the computation to the multiplexer module.

According to another embodiment, the multiplexer module comprises a first and a second memory region, and the method further comprises, upon receiving the first data processing request, assigning a first request sub-region of the first memory region and a first result sub-region of the second memory region to the driver, transmitting the communication data by the multiplexer module to the driver, the communication data being data indicative of the first request sub-region and the first result sub-region, thereby causing the driver to exclusively write the first request data unit into the first request sub-region until writing of the first request data unit has been completed, and, upon receiving the first result data unit by the multiplexer module from the first computational engine, making available the first result data unit in the first result sub-region and causing the driver to exclusively read the first result data unit from the first result sub-region.

With continued reference to the previously mentioned embodiment, upon receiving the first data processing request, the multiplexer module assigns the first request sub-region of the first memory region and the first result sub-region of the second memory region to the driver. According to embodiments, the first request sub-region and the first result sub-region are dynamically allocated. The first request sub-region is a memory region into which the driver may write data. Specifically, the driver may write the first request data unit into the first request sub-region. The first result sub-region is a memory region from which the driver may read data. Specifically, the driver may read the first result data unit from the first result sub-region.

According to embodiments, the first request sub-region and the first result sub-region may be accessed via the network bus. This embodiment may have the advantage that a first request sub-region and a first result sub-region are provided for communicating data related to the first data processing request. Since the driver may use the sub-regions for communication exclusively, no lock-related functionality needs to be implemented on the driver side. By storing data in sub-regions, large blocks of data can be handled.

According to embodiments, the first request sub-region may have a memory size specified in the first data processing request. According to further embodiments, the first result sub-region may have a memory size specified in the first data processing request. Therefore, request sub-regions and result sub-regions of varying sizes can be provided, conforming to requirements of respective data processing requests. The multiplexer module may transmit communication data which indicates properties of the first request sub-region and of the first result sub-region to the driver. According to embodiments, the driver can therefore write the first request data unit into the first request sub-region and read the first result data unit from the first result sub-region. In exemplary embodiments, it is preferable if data can only be written to, but not read from the first request sub-region. It is also preferable if data can only be read from, but not written to, the first result sub-region.

According to an embodiment, the method further comprises exposing a request register of the multiplexer module to data processing requests, and receiving at the request register the first data processing request. This may have the advantage that data processing requests can be received by the multiplexer module over an interface which is available permanently. According to another embodiment, the request register can be accessed via the network bus by using a network bus address of the request register. According to embodiments, the network bus address of the request register is static. It is an inherent advantage of using the network bus since it provides a means for conflict resolution between different drivers.

According to an embodiment, the method further comprises, in response to receiving the information indicative of the driver and of the first data processing request, transmitting by the multiplexer module to the driver data transmission indicators selected from the group consisting of a start address of the first request sub-region, a size of the first request sub-region, an interrupt address within the first request sub-region for signaling that a request data unit has been written into the first request sub-region, a start address of the first result sub-region, and a size of the first result sub-region. In this manner, the multiplexer module may provide communication data to the driver. One address within the first request sub-region may be designated as the interrupt address, which may have the following purpose: According to exemplary embodiments, the driver writes the first request unit into the first sub-region. In order to indicate to the multiplexer module that writing the first request data unit into the first request sub-region has completed, the driver may write data to the interrupt address within the first request sub-region. This causes the multiplexer module to process the data which have been written into the first request sub-region.

According to an embodiment, the method further comprises extracting by the multiplexer module an interrupt address of the driver contained within the first data processing request and causing by the multiplexer module the driver to access the first result data unit in the first result sub-region by writing to the interrupt address of the driver. After the multiplexer module has received the first result data unit from the set of one or more computational engines, the multiplexer module may make the first result data unit available in the first result sub-region. According to embodiments, the multiplexer module may then write data to the interrupt address of the driver. In response, the driver may then access the first result data unit in the second memory region. According to embodiments, the driver then reads the first result data unit from the first result sub-region. This embodiment may have the advantage that it allows the driver to be triggered to read the first result data from the multiplexer module.

According to an embodiment, the method further comprises providing a set of logical buffers in the multiplexer module, each logical buffer being associated with a priority class, in response to receiving the first data processing request, selecting a first logical buffer from the set of logical buffers to store the first request data unit, the priority class of the first logical buffer corresponding to the first priority class, in response to receiving the first request data unit by the multiplexer module, storing the first request data unit in the first logical buffer, removing request data units from the first logical buffer which precede the first request data unit within the first logical buffer until the first request data unit reaches an output position of the first logical buffer, and, when the first request data unit has reached the output position of the first logical buffer, transmitting the first request data unit to the set of one or more computational engines and removing the first request data unit from the first logical buffer. This may have the advantage that the multiplexer module places incoming request data units in into logical buffers according to their priorities. According to embodiments, the logical buffers may have different sizes, thereby influencing how quickly request data units are processed.

The logical buffers, according to this embodiment, may temporarily store incoming request data units within the multiplexer module. It may be necessary to temporarily store request data units within logical buffers if all computational engines are occupied. According to embodiments, the logical buffers from the set of logical buffers provide queues for processing request data units sequentially. According to an embodiment, the logical buffers from the set of logical buffers have a first in, first out (FIFO) data structure. According to an embodiment, the logical buffers are implemented as ring buffers. However, the logical buffers may also be implemented according to other designs. Each logical buffer is associated with a priority class. According to an embodiment, one logical buffer may be associated with more than one priority class. When the first data processing request is received by the multiplexer, the first logical buffer is selected for storing the first request unit because the first logical buffer has a corresponding priority class. When the multiplexer module receives the first request data unit, the first request data unit is stored in the first logical buffer. When other data processing requests are received, the multiplexer module may select other logical buffers for storing request data units associated with the other data processing requests. According to an embodiment, it is possible that the first logical buffer is selected for storing other request data units in addition to storing the first request data unit.

According to a further embodiment, after selecting the first logical buffer from the set of logical buffers to store the first request data unit, the multiplexer module transmits to the driver a first logical buffer address or a first range of logical buffer addresses that allows to write data into the first logical buffer. This embodiment may have the advantage that information for accessing a specific buffer is provided to the driver. According to a first variant, the first logical buffer address is used. The driver may write data associated with the first request data unit to the first logical buffer address in sequential steps, causing the data to be stored in the first logical buffer. According to a second variant, the first range of logical buffer addresses is used. The first request data unit may fit into the first range of logical buffer addresses as a whole. According to an embodiment, the first range of logical buffer addresses coincides with a range of network bus addresses belonging to the first request sub-region. Therefore, any data written into the first request sub-region is stored in the first logical buffer. According to an embodiment, when the driver has completed writing the first request data unit into the first request sub-region and has triggered the interrupt located within the first request sub-region, the multiplexer module moves the first request data unit into the first logical buffer.

According to an embodiment, the method comprises, in response to receiving the first data processing request, selecting a randomly chosen bus address as the first logical buffer address or selecting a random range of bus addresses as the first range of logical buffer addresses, enabling write access to the first logical buffer via the first logical buffer address or via the first range of logical buffer addresses, and, after receiving the first request data unit by the multiplexer module has been completed, disabling access to the first logical buffer via the first logical buffer address or via the first range of logical buffer addresses. Therefore, the first logical buffer address, or the first range of logical buffer addresses, is dynamically allocated. This may have the advantage that only a driver that knows the logical buffer address, or the first range of logical buffer addresses, can access the first logical buffer. This may make it difficult for a malicious driver to write data into a logical buffer that it should not have access to. According to preferred embodiments, the multiplexer module ensures that the randomly chosen bus address or that the bus addresses from the random range of bus addresses, respectively, are provided to only one driver at the same time. In order to prevent misuse of the first logical buffer address, or the first range of logical buffer addresses, access via the first logical buffer address, or the first range of logical buffer addresses, is disabled after the first request data unit has been transmitted to the multiplexer module by the driver.

According to another embodiment, the method comprises, in response to receiving the first data processing request, extracting from the first data processing request a first source address identifying a driver that has sent the first data processing request, in response to receiving the first request data unit, extracting from the first request data unit a second source address identifying a driver that has sent the first request data unit, and storing the first request data unit in the first logical buffer only if the first source address corresponds to the second source address. This allows the multiplexer module to perform access control. The first source address, which is included in the first data processing request according to some embodiments, can be used to identify a source which has sent the first data processing request. The first source address may be a network bus address of a driver. The multiplexer module expects the first request data unit to be sent by the same driver.

According to embodiments of the invention, the first request data unit includes the second source address, which can be used to identify a source which has the sent the first request data unit. By comparing the first source address to the second source address, the multiplexer module can ensure that the first data processing request, and the first request data unit, originate from the same driver. This may have the advantage that it can be prevented that drivers write data into address ranges which have not been assigned to them.

According to an embodiment, the method comprises, in response to receiving the first data processing request, rejecting the first data processing request if a request size specified in the first data processing request exceeds a size of free memory of the first logical buffer. This may have the advantage that a mechanism is provided that handles cases in which the multiplexer module would not be able store the first request data unit. The first logical buffer may be full or there may be only an insufficient amount of free space left in the first logical buffer. The multiplexer module can then reject the first data processing request. According to an embodiment, the request size specifies a size of the first request data unit. Rejecting the first data processing request may comprise transmitting a rejection message to the driver by the multiplexer module.

According to another embodiment, the method comprises, when the first request data unit has reached the output position of the first logical buffer, if other request data units are available at output positions of other logical buffers of the multiplexer module, transmitting the first request data unit and the other request data units to the set of one or more computational engines in an order determined by the first priority class and respective priority classes associated with the other request data units. According to select embodiments, the multiplexer module may provide multiple logical buffers. In such embodiments, the multiplexer can determine an order in which request data units from the multiple logical buffers are transmitted to the set of one or more computational engines. This embodiment may have the advantage that request data units are transmitted to the set of one or more computational engines in an order determined by their respective priority classes. Therefore, a request data unit with a high priority class may be transmitted before a request data unit with a low priority class. However, according to other embodiments, arbitration at this stage may not be based on priority classes. For example, according to an embodiment, request data units from different logical buffers may be transmitted to the set of logical buffers in an order determined by round-robin scheduling. According to embodiments, the order in which request data units are transmitted may be determined by a queue arbiter of the multiplexer module.

According to embodiments of the invention, the priority class may be inferred by evaluating a destination address contained within the first data processing request. This may have the advantage that the driver may determine the priority by which a request is handled by choosing a particular destination address. According to this embodiment, the multiplexer module evaluates the destination address contained within the first data processing request. The priority class may be encoded in the destination address in various ways.

According to some embodiments, the multiplexer module may infer further information from the destination address. For instance, hardware-relevant attributes such as a maximum size of the first request data unit or a maximum size of the first result data unit may be encoded within the destination address. In this way, both information regarding a priority of a data processing request and information regarding the size of the associated request data unit or result data unit may be provided at the same time. According to an embodiment, other attributes may be encoded within the destination address as well, for instance a request type.

According to an embodiment, the first priority class is inferred by evaluating a range of higher-order bits of the destination address. The multiplexer module may evaluate at least one higher-order bit of the destination address. According to embodiments, lower-order bits of the destination address contain a network bus address of the multiplexer module. In particular, the lower-order bits may specify a network bus address of the request register. The higher-order bits may encode the priority of the first priority request. According to embodiments, the destination address may therefore function as a virtual address which allows addressing different virtual request registers of the multiplexer module. Different priorities may be specified by transmitting data processing requests to different virtual request registers. This embodiment may have the advantage that the driver may specify a desired priority by means of the destination address. According to embodiments, the range of higher-order bits may also be used to specify other attributes of the first data processing request.

According to another embodiment, the first priority class is inferred by evaluating a source address identifying the first driver contained within the first data processing request. This embodiment may have the advantage that priority classes may be inferred on the basis of an origin of the first data processing request. According to an embodiment of the invention, the multiplexer module contains a list of source addresses, each source address belonging to a driver. According to embodiments, a priority class may be associated with each driver. By means of the list, a source address may be matched with a certain priority class. According to some embodiments, the multiplexer module may infer further information from the source address. For instance, the multiplexer module may infer a maximum size of the first request data unit or a maximum size of the first result data unit from the source address.

According to other embodiments, the first priority class may be inferred by both evaluating the destination address contained within the first data processing request and by evaluating the source address identifying the first driver contained within the first data processing request. This embodiment may have the advantage that priority classes may be inferred by taking into account the origin of the first priority request and the desired priority as indicated by the driver.

According to an embodiment, the method further comprises providing a set of virtual channels, each virtual channel being associated with at least one priority class, providing a maximum occupancy for a first virtual channel from the set of virtual channels and providing an occupancy data field for indicating a current occupancy of the first virtual channel, in response to receiving the first data processing request, if the first priority class corresponds to the at least one priority class associated with the first virtual channel, evaluating the occupancy data field in order to determine the current occupancy of the first virtual channel, and, if the current occupancy equals the maximum occupancy of the first virtual channel, rejecting the first data processing request, and otherwise accepting the first data processing request and recording an increase of the current occupancy in the occupancy data field. Virtual channels may be used in order to implement flow control mechanisms. The embodiment may have the advantage that it allows for flow control by representing the processing capabilities of the multiplexer module, and the set of one or more computational engines, by means of virtual channels. According to embodiments, the maximum occupancy of the virtual channels may be configurable.

According to embodiments, each virtual channel may be associated with one or more priority classes. After the multiplexer module receives the first data processing request, it infers the first priority class from the first data processing request. If the first virtual channel is associated with the first priority class, then the first data processing request will occupy a virtual slot in the first virtual channel. The maximum occupancy of the first virtual channel determines a maximum amount of data processing requests that the first virtual channel allows for. The occupancy data field records the current occupancy of the first virtual channel. The first data processing request is rejected if a maximum capacity of the first virtual channel has been reached.

According to an embodiment, the method further comprises, after causing the driver to read the first result data unit from the multiplexer module, recording a decrease of the current occupancy in the occupancy data field. This means that a slot in the virtual channel is freed when the multiplexer module has finished processing the first data processing request. According to this embodiment, the first data processing request is deemed to have been completed as soon as the driver has read the first result data unit from the multiplexer module.

According to an embodiment, when the multiplexer module begins operation, the occupancy data field is initialized with the maximum occupancy of the first virtual channel. Conceptually, a value stored in the occupancy data field can be interpreted as a number of tokens, each token representing an unoccupied slot of the first virtual channel. Whenever a new data processing request is accepted, a token is removed. When there are no more tokens left, then no more slots are available in the virtual channel. Therefore, whenever a new data processing request is accepted, the value stored in the occupancy data field is decremented, recording an increase of the current occupancy. When the value has decreased to zero, then this means that the first virtual channel has no more unoccupied slots. No further data processing requests are accepted. Whenever a data processing request is completed, the value stored in the occupancy data field is increased, recording a decrease of the current occupancy of the first virtual channel. According to other embodiments, recording the occupancy of the first virtual channel and other virtual channels may be implemented in other ways.

According to another embodiment, the method further comprises, in response to receiving the first data processing request, selecting a first logical buffer from a set of logical buffers in the multiplexer module to store the first request data unit, and, if the current occupancy equals the maximum occupancy of the first virtual channel, delaying to transmit the communication data to the driver and thereby accept the first data processing request until the current occupancy no longer equals the maximum occupancy of the first virtual channel. This may have the advantage that a data processing request can be accepted at later point of time if a virtual channel is fully occupied temporarily.

According to an embodiment, the multiplexer module changes an arbitration setting of the network bus so that the network bus processes the first request data unit in relation to other request data units being transferred over the network bus according to a priority set by the multiplexer module, said priority being based on the first priority class. This embodiment has the advantage that priority-based arbitration capabilities of the network bus can be made use of. According to embodiments, the multiplexer module may control how the network bus processes the first request data unit in relation to other request data units. Various network buses allow for priority-based bus arbitration, and to influence priority-based arbitration. For instance, this may be possible if a network bus features switches or similar devices for packet switching which allow for controlling an order in which packets are transferred over the network bus. According to an embodiment of the invention, the network bus of the physical computing device is a peripheral component interconnect (PCI) express bus. According to an embodiment, the multiplexer module provides to the network bus a source address of a driver and a priority class associated with the source address. The network bus can then perform bus arbitration accordingly.

According to some embodiments, infrastructure features of the network bus are used in order to enforce a priority. According to a specific embodiment, this comprises impersonating, by the multiplexer module, multiple bus devices which are handled differently by the network bus. This embodiment is preferably used in conjunction with a network bus that features bus-integrated arbitration hardware, such as switches and the like. As an example, the multiplexer module may make different network addresses available to the bus, each network address being associated with a certain priority. If the network bus is a PCI express bus, then the multiplexer module may declare that each network address belongs to a different PCI express device. This would enable in-band arbitration which is directly provided by the bus hardware of the PCI express bus. According to this example, priority arbitration is delegated to bus-integrated arbitration hardware that is provided by PCI express bus systems.

The present invention also relates to a physical computing device with a multiplexer module and a network bus, the multiplexer module being connected to the network bus, the physical computing device being configured to operate as described above. Embodiments of the physical computing device can perform all of the actions described above in arbitrary combinations.

The present invention also relates to a computer program product for operating a physical computing device with a multiplexer module and a network bus, the multiplexer module being connected to the network bus, the computer program product comprising a computer readable storage medium having program instructions embodied therewith, the program instructions executable by a processor to cause the physical computing device to operate as described above. Embodiments of the physical computing device can perform all of the actions described above in arbitrary combinations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
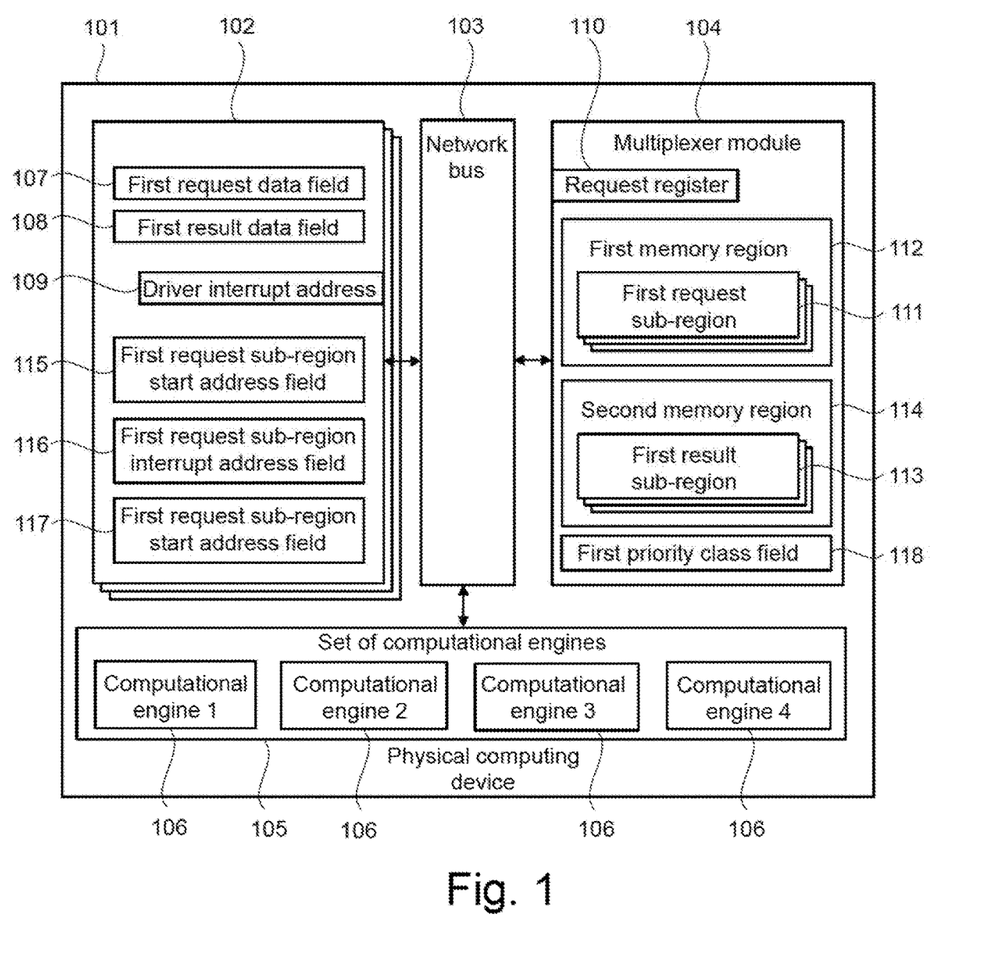
FIG. 1 depicts a block diagram of a physical computing device, in accordance with an embodiment of the present invention.

FIG. 1 depicts a block diagram of a physical computing device 101, in accordance with an embodiment of the present invention. According to this example, the physical computing device features a driver 102, a network bus 103, a multiplexer module 104 and a set of computational engines 105. The set of computational engines 105 comprises multiple computational engines 106. For instance, the computational engines 106 may be cryptographic engines. The driver 102 may contain a first request data field 107 and a first result data field 108. The first request data field 107 contains data which is supposed to be processed by a computational engine 106 from the set of computational engines 105. The driver 102 can transmit the data from the first request data field 107 to the multiplexer module 104 over the network bus 103. The multiplexer module 104 may obtain a result from a computation by one of the computational engines 106 and store the result in the first result data field 108. Said result may be transmitted to the driver 102 over the network bus 103 by the multiplexer module 104. In this example, the driver 102 makes a driver interrupt address 109 available to the network bus 103. The multiplexer module 104 may write data to the driver interrupt address 109 in order to indicate to the driver 102 that the result is ready for transmission from the multiplexer module 104 to the driver 102.

The multiplexer module 104 may feature a request register 110. The request register 110 may be accessed by the driver 102 over the network bus 103. The driver 102 may write a first data processing request into the request register 110. In response, the multiplexer module 104 allocates a first request sub-region 111 in a first memory region 112 of the multiplexer module 104 and a first result sub-region 113 of a second memory region 114 of the multiplexer module 104. According to this example, the first memory region 112 can only be written to and the second memory region 114 can only be read from. Multiple request sub-regions and result sub-regions may be allocated in the first memory region 112 and the second memory region 114, respectively. The first request sub-region 111 allows the driver 102 to write data to the multiplexer module 104 and the first result sub-region allows the driver 102 to read data from the multiplexer module 104.

The driver 102 may store auxiliary communication data for communicating with the multiplexer module 104. For instance, it may store a start address of the first request sub-region 111 in a first request sub-region start address field 115, an interrupt address of the first request sub-region 111 in a first request sub-region interrupt address field 116, and a start address of the first result sub-region 113 in a first result sub-region start address field 117. The multiplexer module 104 may access the computational engines 106 over the network bus 103. However, alternatively, it is also possible that the multiplexer module 104 accesses the computational engines 106 over another bus system or via direct communication lines. According to other examples, it is possible that the computational engines 106 are integrated into the multiplexer module 104. The multiplexer module 104 is able to infer a first priority class from the first data processing request. Exemplarily, the first priority class is stored in a first priority class field 118 of the multiplexer module 104. The multiplexer module 104 may manipulate a priority with which the physical computing device 101 handles the first request unit in relation to other request unit according to the first priority class.

Figure 2:
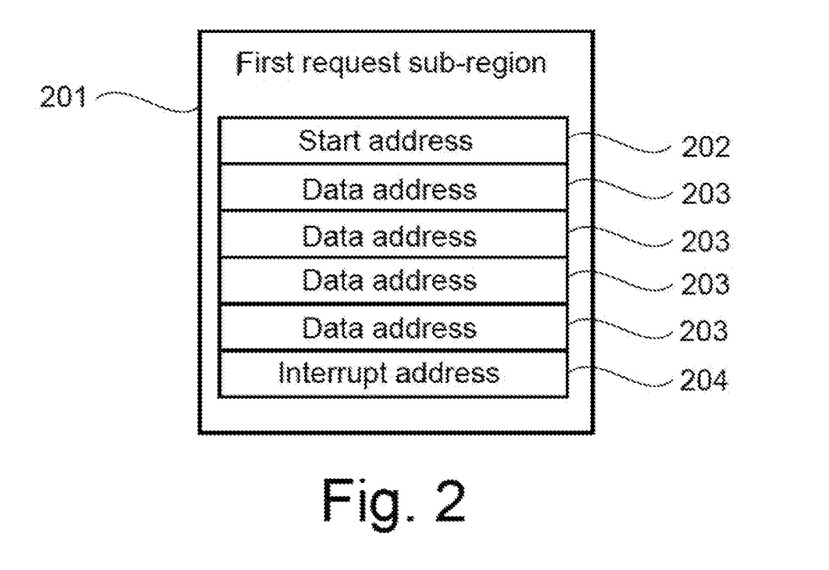
FIG. 2 depicts a block diagram detailing a data structure of a first request sub-region within a multiplexer module of the physical computing device, in accordance with an embodiment of the present invention.

FIG. 2 depicts a block diagram detailing a data structure of the first request sub-region 201 within the multiplexer module of the physical computing device, in accordance with an embodiment of the present invention. According to this example, data fields in the first request sub-region 201 can be accessed via a start address 202 and via multiple data addresses 203. The start address 202 marks a beginning of the first request sub-region 201. The first request sub-region 201 is exemplarily provided with an interrupt address 204. By writing to the interrupt address 204, a driver can indicate to the multiplexer module that the driver has completed writing data to the first request sub-region 201. The interrupt address 204 directly follows the preceding data addresses. However, according to other variants, it is also possible to locate the interrupt address 204 at another location within the first request sub-region 204.

Figure 3:
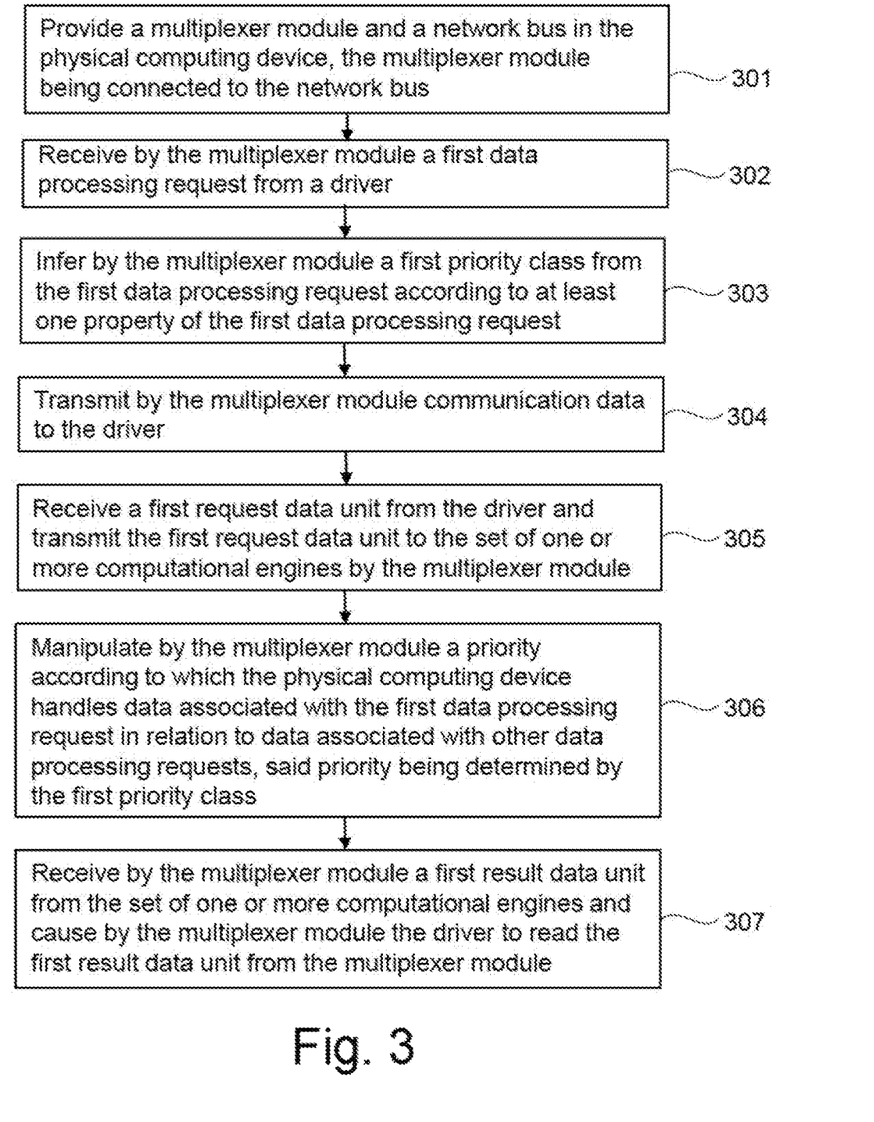
FIG. 3 depicts a flowchart detailing the operation of the physical computing device, in accordance with an embodiment of the present invention.

FIG. 3 depicts a flowchart detailing the operation of the physical computing device, in accordance with an embodiment of the present invention. The method provides a multiplexer module and a network bus in the physical computing device, the multiplexer module being connected to the network bus (301). The multiplexer module may subsequently receive a first data processing request from a driver (302). The multiplexer module infers a first priority class from the first data processing request according to at least one property of the first data processing request (303). In addition, the multiplexer module transmits communication data to the driver (304). The communication data is provided for enabling transmission of a first request data unit and a first result data unit between the driver and the multiplexer module, the first request data unit and the first result data unit being associated with the first data processing request. According to this example, the multiplexer module subsequently receives the first request data unit from the driver and transmits the first request data unit to the set of one or more computational engines (305). The multiplexer module also manipulates a priority according to which the physical computing device handles data associated with the first data processing request in relation to data associated with other data processing requests, said priority being determined by the first priority class (306). Therefore, the first request data unit may be processed by the physical computing device with a lower or a higher priority, depending on the first priority class. Finally, the multiplexer module receives the first result data unit from the set of one or more computational engines and causes the driver to read the first result data unit from the multiplexer module (307). This may be accomplished by writing to an interrupt address of the driver, causing the driver to read the first result data unit from the multiplexer module.

Figure 4:
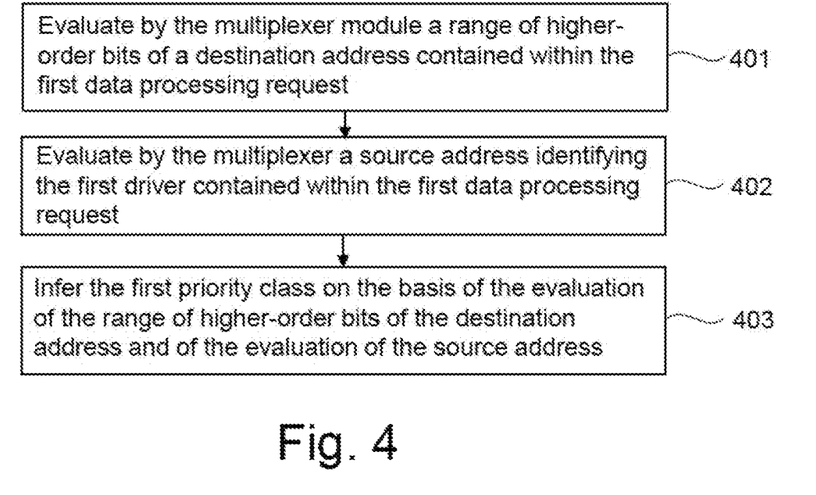
FIG. 4 depicts a flowchart detailing how the multiplexer module may infer a priority class from a processing request, in accordance with an embodiment of the present invention.

FIG. 4 depicts a flowchart detailing how the multiplexer module may infer a priority class from a processing request, in accordance with an embodiment of the present invention. According to this example, the multiplexer module evaluates a range of higher-order bits of a destination address contained within the first data processing request (401). For instance, the destination address may be an address of a request register of the multiplexer module. While the higher-order bits indicate a desired priority, lower-order bits of the destination address identify a physical instance of the request register. The multiplexer module also evaluates a source address identifying the first driver contained within the first data processing request (402). As an example, the source address may be a network bus address of the driver. Subsequently, the multiplexer module infers the priority class on the basis of the evaluation of the range of higher-order bits of the destination address and of the evaluation of the source address (403). The results of both evaluations are combined. According to other examples, the multiplexer module may infer the priority by only evaluating the range of higher-order bits of the destination address, or by only evaluating the source address.

Figure 5:
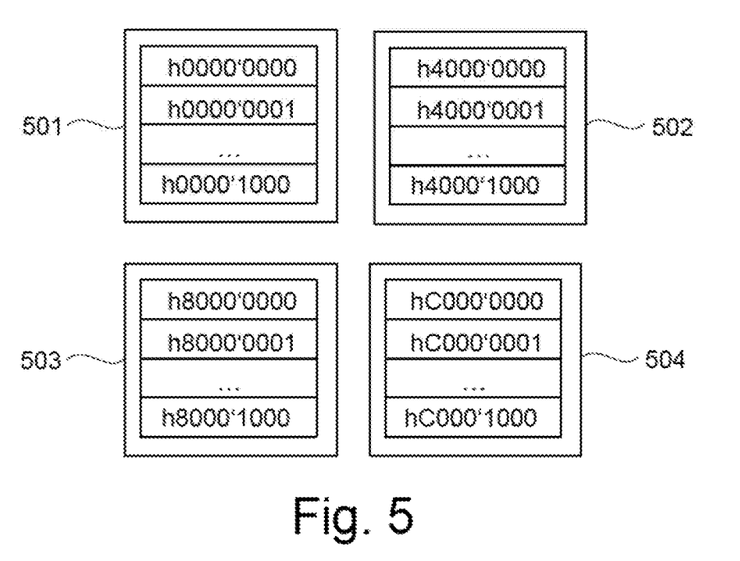
FIG. 5 depicts a priority-indicating address scheme for accessing request registers of the multiplexer module, in accordance with an embodiment of the present invention.

FIG. 5 depicts a priority-indicating address scheme for accessing request registers of the multiplexer module, in accordance with an embodiment of the present invention. A 32-bit address range contains four priority windows 501, 502, 503 and 504, each of the priority windows 501, 502, 503, and 504 representing an address range. In FIG. 5, all addresses are indicated as hexadecimal values. Two higher-order bits indicate a desired priority class. The first priority window 501 allows to access a request register while indicating that processing with a first priority is desired. A second priority window 502 allows to access a request register while indicating that processing with a second priority is desired. A third priority window 503 allows to access a request register while indicating that processing with a third priority is desired. A fourth priority window 504 allows to access a request register while indicating that processing with a fourth priority is desired. For instance, a request register may be accessed via the address h0000'0100 in order to indicate that processing with the first priority is desired, and the same physical request register may be accessed via the address hC000'0100 in order to indicate that processing with the fourth priority is desired.

Figure 6:
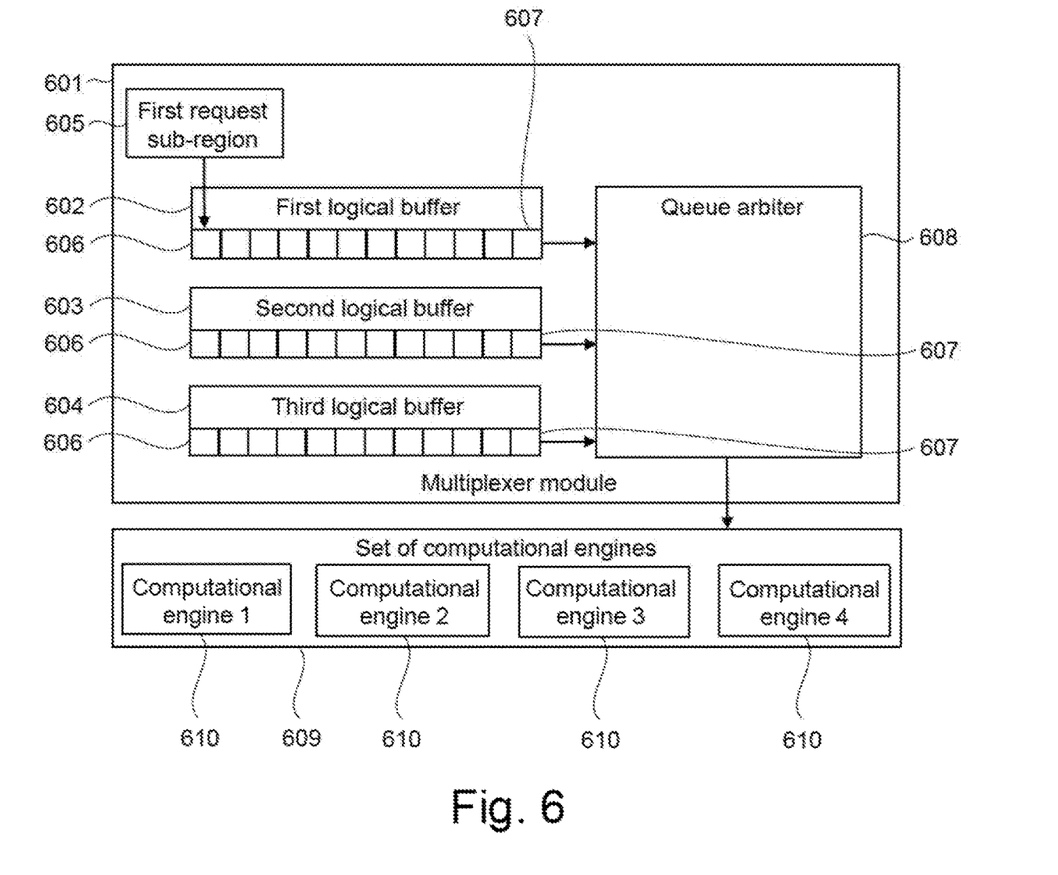
FIG. 6 depicts a block diagram detailing a set of logical buffers of the multiplexer module, in accordance with an embodiment of the present invention.

FIG. 6 depicts a block diagram detailing a set of logical buffers of the multiplexer module 601, in accordance with an embodiment of the present invention. The set of logical buffers may consist of a first logical buffer 602, a second logical buffer 603, and a third logical buffer 604. According to this example, the first logical buffer 602 has been selected to store a first request data unit. The first request data unit is written into a first request sub-region 605 of the multiplexer module 601 by a driver. The first logical buffer 602 then stores the first request data unit at an input position 606 of the first logical buffer 602. The second logical buffer 603 and the third logical buffer 604 store request data units from other request sub-regions at their respective input positions 606. Having traversed the logical buffers 602, 603, and 604, request data units reach output positions 607 of the logical buffers 602, 603, and 604. The request data units are then processed by a queue arbiter 608 of the multiplexer module 601. If multiple request data units are available at the output positions 607 of the logical buffers 602, 603, and 604 at the same time, the queue arbiter 608 may determine an order in which the request data units are transmitted to a set of computational engines 609. The set of computational engines 609 contains four computational engines 610. According to an example, the queue arbiter 608 determines the order based on priority classes associated with the request data units, respectively. According to another example, the queue arbiter 608 determines the order by means of round-robin scheduling.

Figure 7:
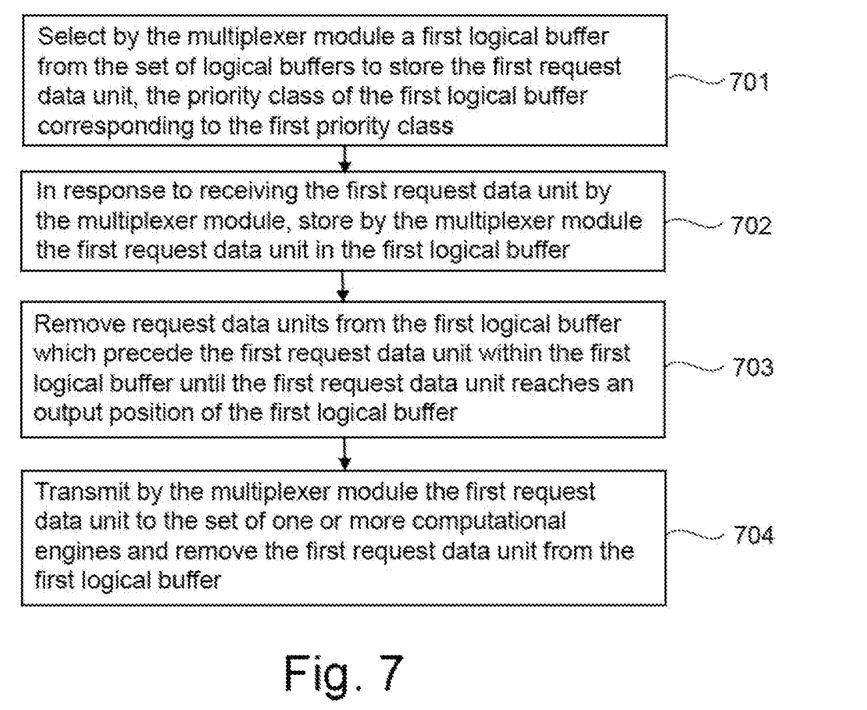
FIG. 7 depicts a flowchart detailing the operation of the logical buffers, in accordance with an embodiment of the present invention.

FIG. 7 depicts a flowchart detailing the operation of the logical buffers, in accordance with an embodiment of the present invention. The multiplexer module may select a first logical buffer from the set of logical buffers to store the first request data unit, the priority class of the first logical buffer corresponding to the first priority class (701). The first logical buffer is therefore selected to store the first request data unit. According to an example, this may be accomplished by having the first logical buffer listen to a first network bus address or to a range of first network bus addresses. The range of first network bus addresses may correspond to the first request sub-region. According to an example, the first logical buffer may listen to multiple network bus addresses or to multiple ranges of network bus addresses. This would allow the first logical buffer to process multiple different request data units, which may originate from different drivers. In response to receiving the first request data unit by the multiplexer module, the multiplexer module stores the first request data unit in the first logical buffer (702). The multiplexer module may then remove request data units from the first logical buffer which precede the first request data unit within the first logical buffer until the first request data unit reaches an output position of the first logical buffer (703). The multiplexer module transmits the first request data unit to the set of one or more computational engines and removes the first request data unit from the first logical buffer (704). According to an example, this may be done when the first request data unit has reached the output position of the first logical buffer. According to some examples, the first request data unit may be subject to processing by a queue arbiter of the multiplexer module before the request data unit is transmitted to the set of one or more computational engines.

Figure 8:
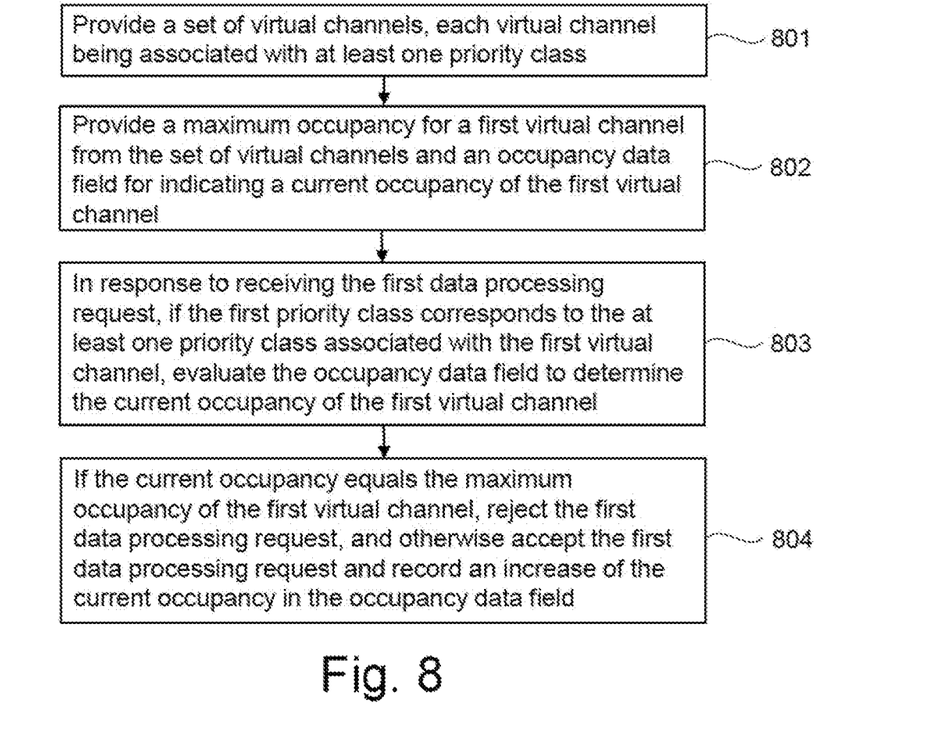
FIG. 8 depicts a flowchart detailing a flow control method implemented by the multiplexer module, in accordance with an embodiment of the present invention.

FIG. 8 depicts a flowchart detailing a flow control method implemented by the multiplexer module, in accordance with an embodiment of the present invention. According to this example, the multiplexer module provides a set of virtual channels, each virtual channel being associated with at least one priority class (801). In addition, the multiplexer module provides a maximum occupancy for a first virtual channel from the set of virtual channels and an occupancy data field for indicating a current occupancy of the first virtual channel (802). The maximum occupancy determines how many requests can be handled by the first virtual channel. This parameter can be provided for other virtual channels from the set of virtual channels, as well. The amount of virtual channels and their respective maximum occupancies can be determined when initializing the physical computing device. According to other examples, these parameters can be changed during operation of the physical computing device. In response to receiving the first data processing request, if the first priority class corresponds to the at least one priority class associated with the first virtual channel, the multiplexer module evaluates the occupancy data field to determine the current occupancy of the first virtual channel (803). This means that the multiplexer module determines which virtual channel is responsible for tracking the first data processing request. If the current occupancy equals the maximum occupancy of the first virtual channel, the multiplexer module rejects the first data processing request, and otherwise, the multiplexer module accepts the first data processing request and records an increase of the current occupancy in the occupancy data field (804). Therefore, the virtual channels provide a way for providing flow control by the multiplexer module.

Figure 9:
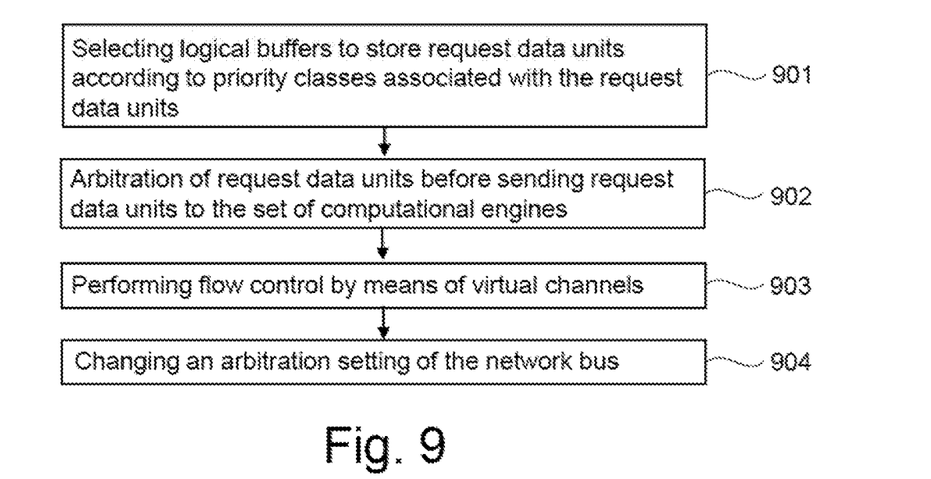
FIG. 9 depicts a flowchart providing an overview of how a priority of handling data associated with a first data processing request may be manipulated, in accordance with an embodiment of the present invention.

FIG. 9 depicts a flowchart providing an overview of how the priority of handling data associated with the first data processing request may be manipulated, in accordance with an embodiment of the present invention. The data associated with the first data processing request may comprise data contained within the first data processing request, the first request data unit and the first result data unit. Selecting logical buffers to store request data units according to priority classes associated with the request data units (901) changes the priority of how the request data units are handled by the multiplexer module. For instance, a request data unit may be processed more slowly and therefore with a lower priority if it is stored by a logical buffer which also has to store many other request data units. According to the present example, the multiplexer module also performs arbitration of the request data units before sending the request data units to the set of computational engines (902). For example, request data units may be sent to the set of computational engines in an order determined by priority classes that the request data units are associated with. In addition, the multiplexer module may perform flow control by means of virtual channels (903). Virtual channels allow to regulate utilization of the computational engines by different drivers. Exemplarily, the multiplexer module may also change an arbitration setting of the network bus (904). For instance, by changing the arbitration setting of the network bus, the network bus may be instructed to handle first request data units with a higher priority than other request data units, so that the network bus will transmit the first request data units instead of the other request data units in case of a packet collision on the network bus. The aforementioned methods for manipulating the priority can all be applied simultaneously. According to other examples, it is possible that only one of the aforementioned methods is used or that a subset of the aforementioned methods are used in any possible combination.

What is claimed is:

1. A method for managing priority-arbitrated access to a set of one or more computational engines of a physical computing device, the method comprising:
   providing a multiplexer module with a first and a second memory region and a network bus in the physical computing device, the multiplexer module being connected to the network bus;
   receiving by the multiplexer module a first data processing request from a driver;
   assigning a first request sub-region of the first memory region and a first result sub-region of the second memory region to the driver;
   inferring by the multiplexer module a first priority class from the first data processing request according to at least one property of the first data processing request;
   transmitting by the multiplexer module communication data to the driver, the communication data being provided for enabling transmission of a first request data unit and a first result data unit between the driver and the multiplexer module, the first request data unit and the first result data unit being associated with the first data processing request, and the communication data being data indicative of the first request sub-region and the first result sub-region, thereby causing the driver to exclusively write the first request data unit into the first request sub-region until writing of the first request data unit has been completed;
   receiving via the network bus by the multiplexer module the first request data unit from the driver, making available the first result data unit in the first result sub-region and causing the driver to exclusively read the first result data unit from the first result sub-region;
   processing the first request data unit by the multiplexer module, wherein the processing of the first request data unit comprises transmitting the first request data unit to the set of one or more computational engines;
   manipulating by the multiplexer module a priority according to which the physical computing device handles data associated with the first data processing request in relation to data associated with other data processing requests, said priority being determined by the first priority class; and
   in response to transmitting the first request data unit to the set of one or more computational engines, receiving by the multiplexer module the first result data unit from the set of one or more computational engines, and causing by the multiplexer module the driver to read the first result data unit from the multiplexer module.

2. The method according to claim 1, further comprising:
   exposing a request register of the multiplexer module to data processing requests and receiving at the request register the first data processing request.

3. The method of claim 2, further comprising:
   in response to receiving the information indicative of the driver and of the first data processing request, transmitting by the multiplexer module to the driver data transmission indicators selected from the group consisting of a start address of the first request sub-region, a size of the first request sub-region, an interrupt address within the first request sub-region for signaling that a request data unit has been written into the first request sub-region, a start address of the first result sub-region, and a size of the first result sub-region.

4. The method according to claim 1, further comprising:
   extracting by the multiplexer module an interrupt address of the driver contained within the first data processing request and causing by the multiplexer module the driver to access the first result data unit in the first result sub-region by writing to the interrupt address of the driver.

5. The method according to claim 1, further comprising:
providing a set of logical buffers in the multiplexer module, each logical buffer being associated with a priority class;
in response to receiving the first data processing request, selecting a first logical buffer from the set of logical buffers to store the first request data unit, the priority class of the first logical buffer corresponding to the first priority class;
in response to receiving the first request data unit by the multiplexer module, storing the first request data unit in the first logical buffer;
removing request data units from the first logical buffer which precede the first request data unit within the first logical buffer until the first request data unit reaches an output position of the first logical buffer; and
when the first request data unit has reached the output position of the first logical buffer, transmitting the first request data unit to the set of one or more computational engines and removing the first request data unit from the first logical buffer.

6. The method according to claim 5, comprising:
after selecting the first logical buffer from the set of logical buffers to store the first request data unit, transmitting by the multiplexer module to the driver a first logical buffer address or a first range of logical buffer addresses that allows to write data into the first logical buffer.

7. The method according to claim 6, comprising:
in response to receiving the first data processing request, selecting a randomly chosen bus address as the first logical buffer address or selecting a random range of bus addresses as the first range of logical buffer addresses;
enabling write access to the first logical buffer via the first logical buffer address or via the first range of logical buffer addresses; and
after receiving the first request data unit by the multiplexer has been completed, disabling access to the first logical buffer via the first logical buffer address or via the first range of logical buffer addresses.

8. The method according to claim 5, comprising:
in response to receiving the first data processing request, extracting from the first data processing request a first source address identifying a driver that has sent the first data processing request; and
in response to receiving the first request data unit, extracting from the first request data unit a second source address identifying a driver that has sent the first request data unit, and storing the first request data unit in the first logical buffer only if the first source address corresponds to the second source address.

9. The method according to claim 5, comprising:
in response to receiving the first data processing request, rejecting the first data processing request if a request size specified in the first data processing request exceeds a size of free memory of the first logical buffer.

10. The method according to claim 5, comprising:
when the first request data unit has reached the output position of the first logical buffer, if other request data units are available at output positions of other logical buffers of the multiplexer module, transmitting the first request data unit and the other request data units to the set of one or more computational engines in an order determined by the first priority class and respective priority classes associated with the other request data units.

11. The method according to claim 1, the first priority class being inferred by evaluating a destination address contained within the first data processing request.

12. The method according to claim 11, the first priority class being inferred by evaluating a range of higher-order bits of the destination address.

13. The method according to claim 1, the first priority class being inferred by evaluating a source address identifying the first driver contained within the first data processing request.

14. The method according to claim 1, further comprising:
providing a set of virtual channels, each virtual channel being associated with at least one priority class;
providing a maximum occupancy for a first virtual channel from the set of virtual channels and providing an occupancy data field for indicating a current occupancy of the first virtual channel;
in response to receiving the first data processing request, if the first priority class corresponds to the at least one priority class associated with the first virtual channel, evaluating the occupancy data field in order to determine the current occupancy of the first virtual channel; and
if the current occupancy equals the maximum occupancy of the first virtual channel, rejecting the first data processing request, and otherwise accepting the first data processing request and recording an increase of the current occupancy in the occupancy data field.

15. The method according to claim 14, further comprising:
after causing the driver to read the first result data unit from the multiplexer module, recording a decrease of the current occupancy in the occupancy data field.

16. The method according to claim 14, further comprising:
in response to receiving the first data processing request, selecting a first logical buffer from a set of logical buffers in the multiplexer module to store the first request data unit; and
if the current occupancy equals the maximum occupancy of the first virtual channel, delaying to transmit the communication data to the driver and thereby accept the first data processing request until the current occupancy no longer equals the maximum occupancy of the first virtual channel.

17. The method according to claim 1, the multiplexer module changing an arbitration setting of the network bus so that the network bus processes the first request data unit in relation to other request data units being transferred over the network bus according to a priority set by the multiplexer module, said priority being based on the first priority class.

18. A physical computing device with a multiplexer module and a network bus, the multiplexer module being connected to the network bus, the physical computing device being configured to:
receive by the multiplexer module a first data processing request from a driver;
assign a first request sub-region of the first memory region and a first result sub-region of the second memory region to the driver;
infer by the multiplexer module a first priority class from the first data processing request according to at least one property of the first data processing request;

transmit by the multiplexer module the communication data to the driver, the communication data being provided for enabling transmission of a first request data unit and a first result data unit between the driver and the multiplexer module, the first request data unit and the first result data unit being associated with the first data processing request, and the communication data being data indicative of the first request sub-region and the first result sub-region, thereby causing the driver to exclusively write the first request data unit into the first request sub-region until writing of the first request data unit has been completed;

receive via the network bus by the multiplexer module the first request data unit from the driver, make available the first result data unit in the first result sub-region and causing the driver to exclusively read the first result data unit from the first result sub-region;

process the first request data unit, wherein the processing of the first request data unit comprises transmitting the first request data unit to the set of one or more computational engines;

manipulate by the multiplexer module a priority according to which the physical computing device handles data associated with the first data processing request in relation to data associated with other data processing requests, said priority being determined by the first priority class; and in response to transmitting the first request data unit to the set of one or more computational engines, receive by the multiplexer module the first result data unit from the set of one or more computational engines, and cause by the multiplexer module the driver to read the first result data unit from the multiplexer module.

19. A computer program product for operating a physical computing device with a multiplexer module and a network bus, the multiplexer module being connected to the network bus, the computer program product comprising a non-transitory computer readable storage medium having program instructions embodied therewith, the program instructions executable by a processor to cause the physical computing device to:

receive by the multiplexer module a first data processing request from a driver;

assign a first request sub-region of the first memory region and a first result sub-region of the second memory region to the driver;

infer by the multiplexer module a first priority class from the first data processing request according to at least one property of the first data processing request;

transmit by the multiplexer module the communication data to the driver, the communication data being provided for enabling transmission of a first request data unit and a first result data unit between the driver and the multiplexer module, the first request data unit and the first result data unit being associated with the first data processing request, and the communication data being data indicative of the first request sub-region and the first result sub-region, thereby causing the driver to exclusively write the first request data unit into the first request sub-region until writing of the first request data unit has been completed;

receive via the network bus by the multiplexer module the first request data unit from the driver, make available the first result data unit in the first result sub-region and causing the driver to exclusively read the first result data unit from the first result sub-region;

process the first request data unit, wherein the processing of the first request data unit comprises transmitting the first request data unit to the set of one or more computational engines;

manipulate by the multiplexer module a priority according to which the physical computing device handles data associated with the first data processing request in relation to data associated with other data processing requests, said priority being determined by the first priority class; and in response to transmitting the first request data unit to the set of one or more computational engines, receive by the multiplexer module the first result data unit from the set of one or more computational engines, and cause by the multiplexer module the driver to read the first result data unit from the multiplexer module.

* * * * *